United States Patent
Cunningham

(10) Patent No.: US 9,273,831 B2
(45) Date of Patent: Mar. 1, 2016

(54) LIGHTING FIXTURE AND LIGHT-EMITTING DIODE LIGHT SOURCE ASSEMBLY

(71) Applicant: David W. Cunningham, Los Angeles, CA (US)

(72) Inventor: David W. Cunningham, Los Angeles, CA (US)

(*) Notice: Subject to any disclaimer, the term of this patent is extended or adjusted under 35 U.S.C. 154(b) by 79 days.

(21) Appl. No.: 14/145,511

(22) Filed: Dec. 31, 2013

(65) Prior Publication Data

US 2014/0185288 A1 Jul. 3, 2014

Related U.S. Application Data

(60) Provisional application No. 61/748,410, filed on Jan. 2, 2013.

(51) Int. Cl.

| F21V 7/20 | (2006.01) |
|---|---|
| F21K 99/00 | (2010.01) |
| F21V 29/00 | (2015.01) |
| F21W 131/406 | (2006.01) |
| F21Y 111/00 | (2006.01) |
| F21Y 101/02 | (2006.01) |
| F21V 29/76 | (2015.01) |

(52) U.S. Cl.
CPC ... *F21K 9/13* (2013.01); *F21K 9/50* (2013.01); *F21V 29/006* (2013.01); *F21V 29/76* (2015.01); *F21V 29/767* (2015.01); *F21W 2131/406* (2013.01); *F21Y 2101/02* (2013.01); *F21Y 2111/005* (2013.01); *Y02B 20/386* (2013.01)

(58) Field of Classification Search
CPC ............................... F21V 29/51; F21V 29/71
USPC ......................................................... 362/218
See application file for complete search history.

(56) References Cited

U.S. PATENT DOCUMENTS

| 7,028,759 | B2 | 4/2006 | Rosenfeld et al. | |
|---|---|---|---|---|
| 7,963,686 | B2* | 6/2011 | Hu | 362/547 |
| 2006/0001384 | A1 | 1/2006 | Tain et al. | |
| 2007/0268706 | A1* | 11/2007 | Wagener et al. | 362/348 |
| 2007/0279909 | A1* | 12/2007 | Li | 362/294 |
| 2008/0212325 | A1 | 9/2008 | Wang | |
| 2011/0286207 | A1* | 11/2011 | Chan et al. | 362/217.1 |
| 2011/0310608 | A1 | 12/2011 | Lapatovich | |

FOREIGN PATENT DOCUMENTS

| EP | 1 076 203 | 2/2001 |
|---|---|---|
| JP | 2011 243512 | 12/2011 |

*Primary Examiner* — Evan Dzierzynski
(74) *Attorney, Agent, or Firm* — Sheppard, Mullin, Richter & Hampton, LLP

* cited by examiner

(57) ABSTRACT

An improved LED light source assembly is described, suitable for use as a retrofit for prior lighting fixtures of a kind including a concave reflector, an incandescent lamp positioned with its filament(s) at or near a focal region of the reflector, and a lens assembly for projecting light reflected by the reflector to a distant location, e.g., a theater stage. The improved LED light source assembly includes a compact arrangement of three or more LED assemblies, which are mounted at the forward end of an elongated heat pipe. The heat pipe's rearward end attaches to a heat sink mountable on the back side of the lighting fixture's concave reflector, and the heat pipe extends through a central hole in the reflector to position the LED assemblies at or near the concave reflector's focal region. The concave reflector reflects light emitted by the LED assemblies forward to the lighting fixture's lens assembly, which in turn projects a beam of light to a distant location. The LED light engine's configuration allows a significant proportion of the prior lighting fixture to continue to be utilized, leading to substantial cost saving and simplified installation.

20 Claims, 11 Drawing Sheets

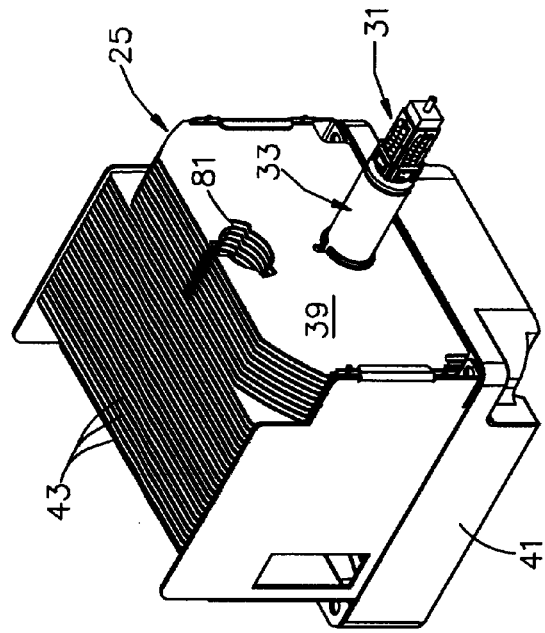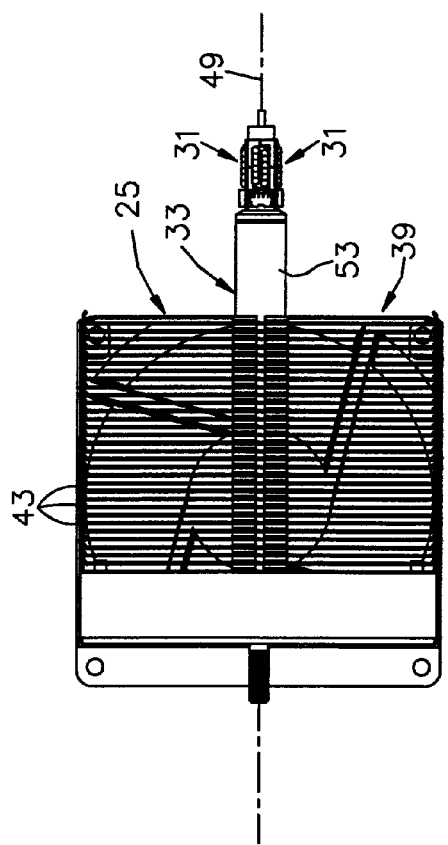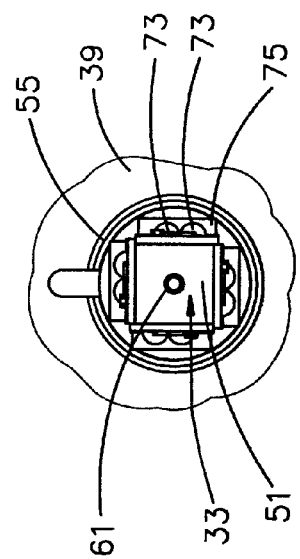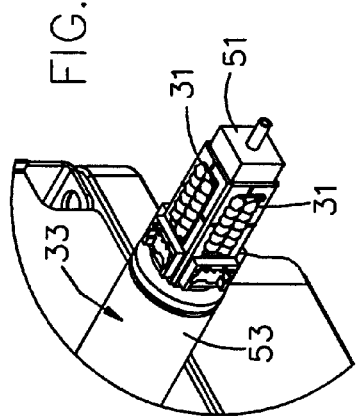

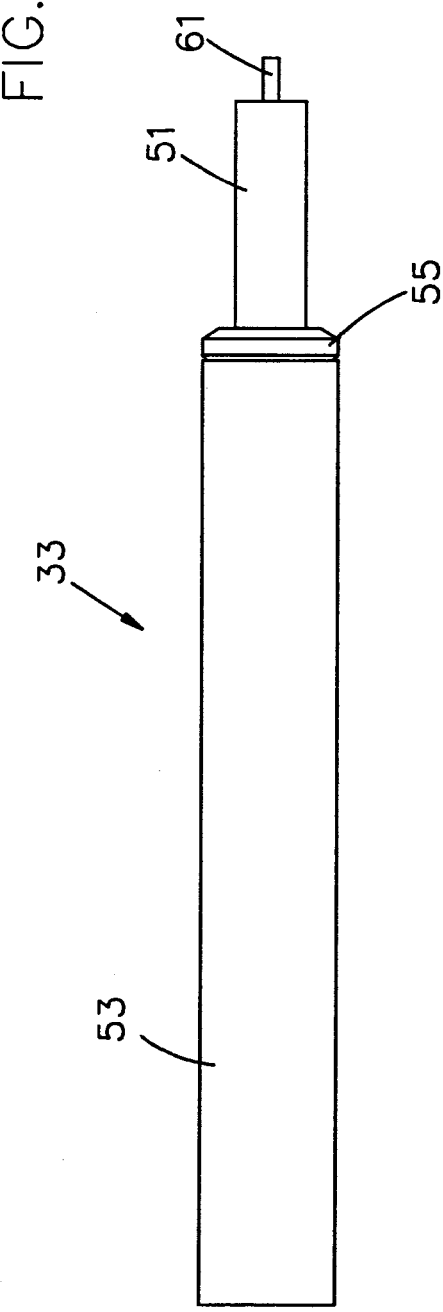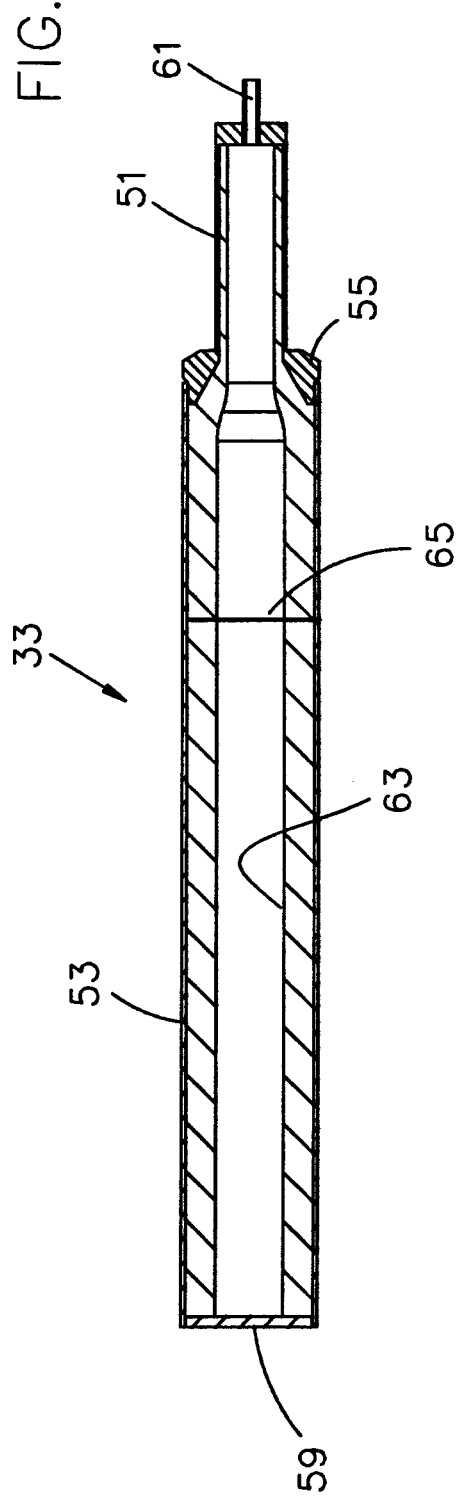

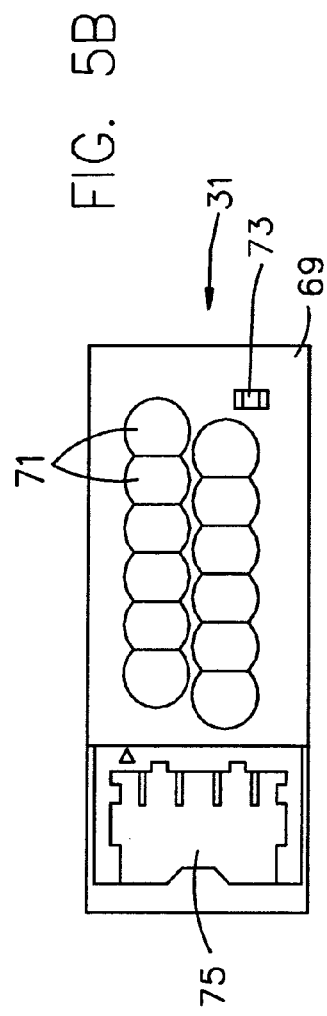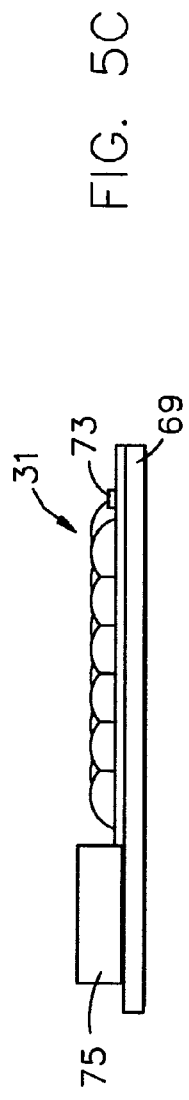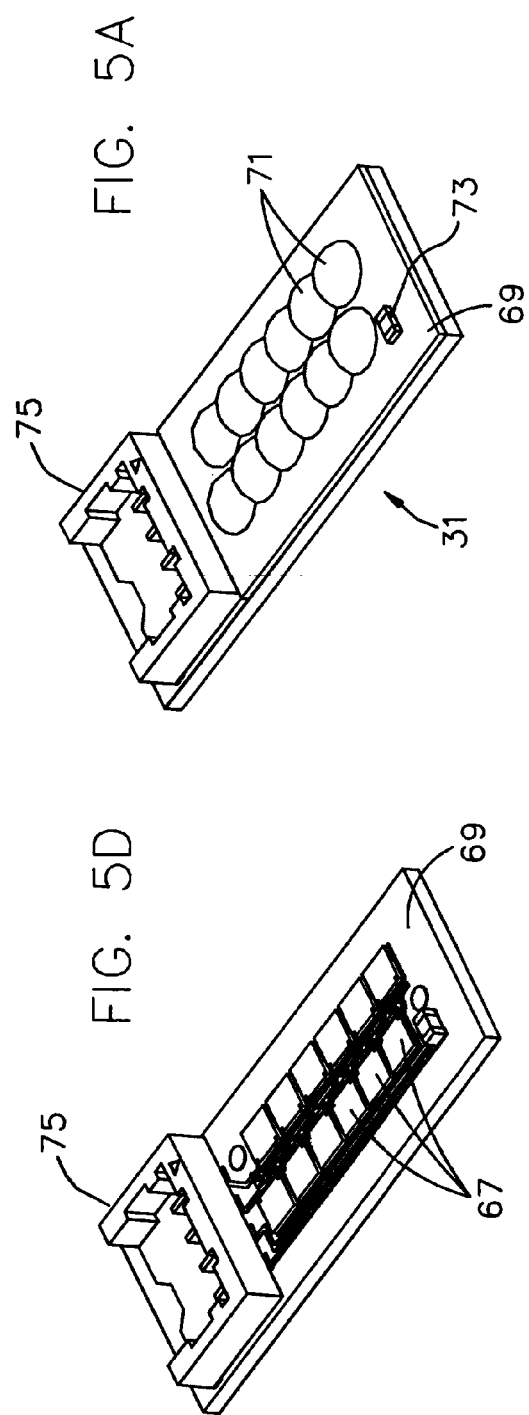

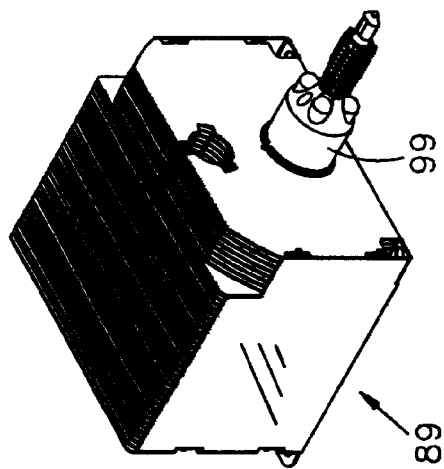
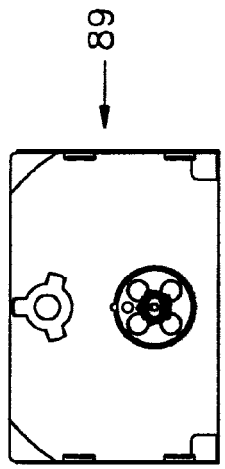
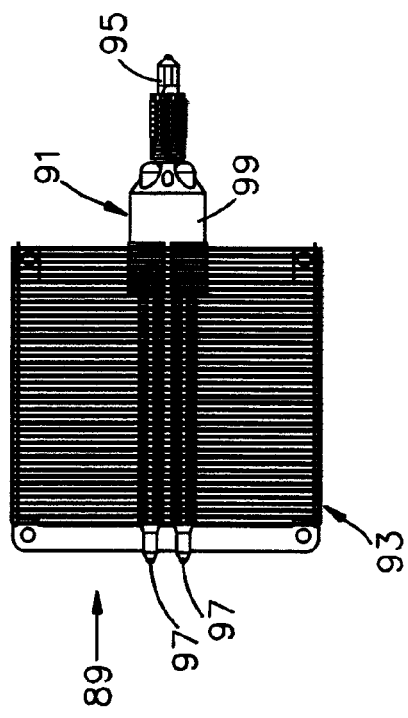
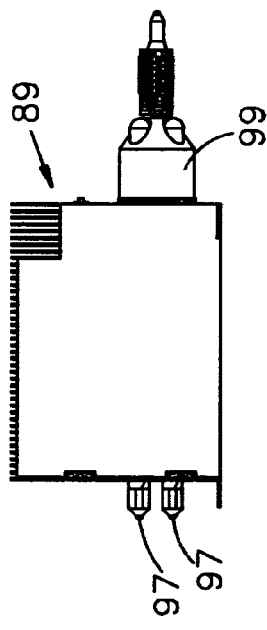
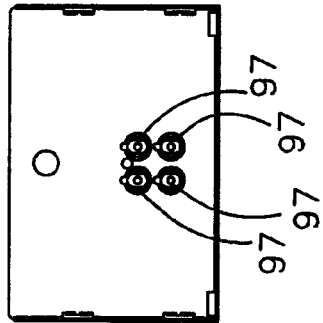

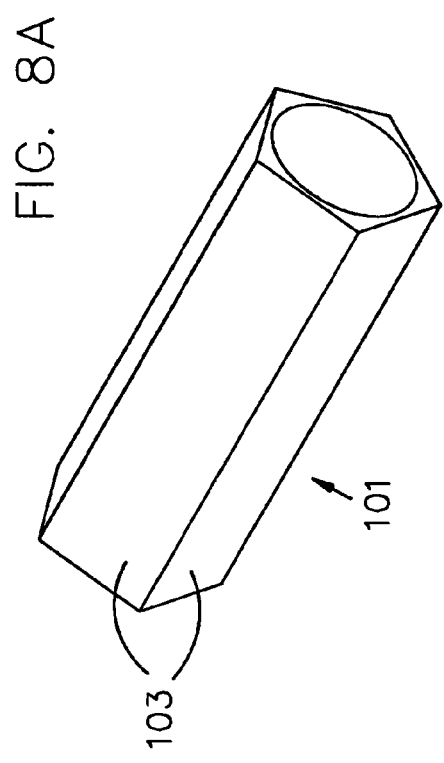
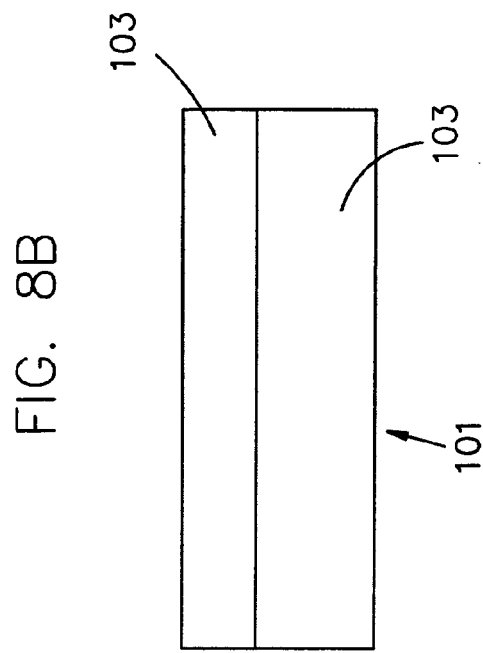
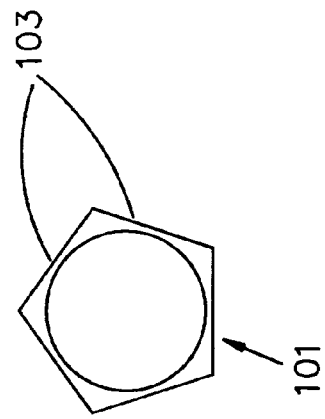

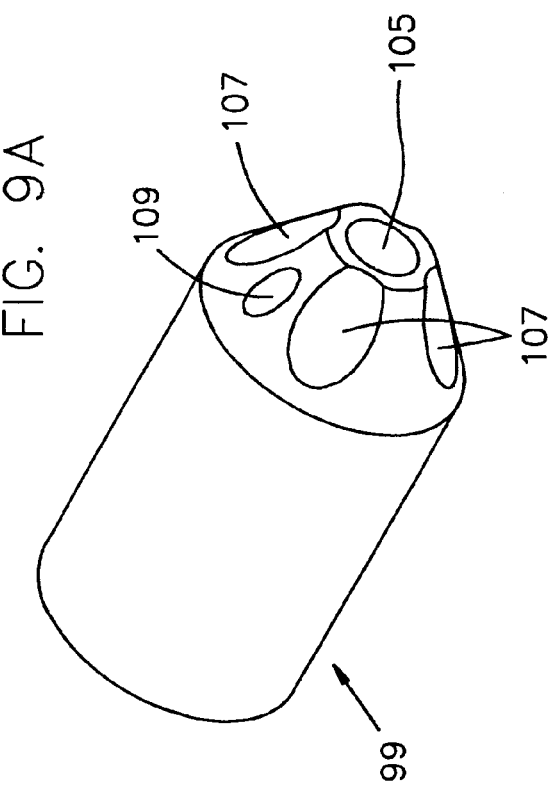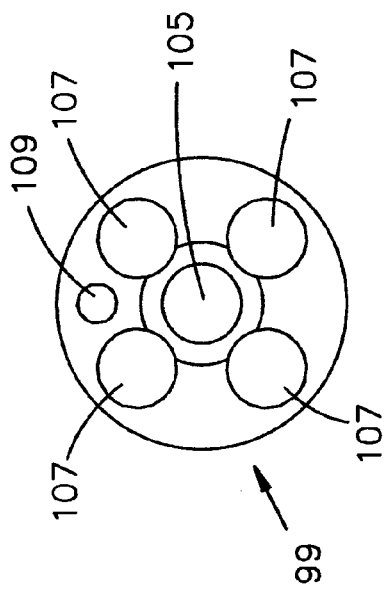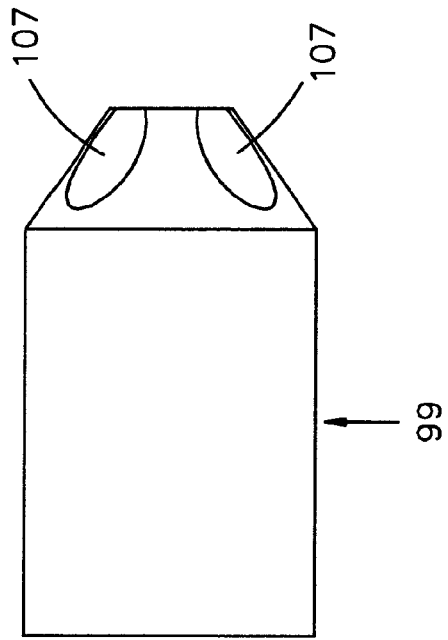

PRIOR TO ASSEMBLY:

AFTER ASSEMBLY:

LED Fixture
Fixed Field

Flat Field

Peak Field

LIGHTING FIXTURE AND LIGHT-EMITTING DIODE LIGHT SOURCE ASSEMBLY

CROSS-REFERENCE TO RELATED APPLICATION

Priority is claimed under 35 U.S.C. §119(e) to U.S. Provisional Application No. 61/748,410, filed by David W. Cunningham on Jan. 2, 2013, and entitled "Lighting Fixture and Light-Emitting Diode Light Source Assembly."

BACKGROUND OF THE INVENTION

This invention relates generally to lighting fixtures for theater, architectural and television lighting applications and, more particularly, to light source assemblies, or light engines, incorporating light-emitting diodes ("LEDs") that are configured as retrofit assemblies for attachment to lighting fixtures previously incorporating incandescent lamps.

Theater, architectural and television lighting fixtures for projecting high-intensity beams of light traditionally have included an incandescent lamp mounted by a burner assembly to a concave reflector, with the lamp's filament(s) located at or near a focal point (or region) of the reflector. A lens assembly is located forward of the lamp and reflector. In use, light emitted by the lamp is reflected in a forward direction by the concave reflector, and the lens assembly in turn projects the reflected light forward along the fixture's longitudinal axis. One type of these fixtures includes a concave reflector having a generally ellipsoidal shape, and the lamp filament(s) is/are located at or near the reflector's near focal region. A gate is located at or near the reflector's second focal region, and the lens assembly images the light passing through the gate at a distant location, e.g., a theater stage. Another type of these fixtures includes a concave reflector having a generally parabolic shape, and the lamp filament(s) is/are located at or near the reflector's single focal region. In this case, the lens assembly simply projects the reflected light in a forward direction, to bathe, or "wash," the distant location.

Lighting fixtures of this type have enjoyed widespread use in the theater, architectural and television lighting fields. Hundreds of thousands of such fixtures are sold every year. However, because of recent advances in the development of high-intensity light-emitting diodes ("LEDs"), the incorporation of incandescent lamps in such fixtures is in some cases now considered unduly wasteful of energy. In addition, such incandescent fixtures generally require frequent servicing due to the relatively short lifetime of incandescent lamps. Efforts, therefore, have been made to retrofit such lighting fixtures by substituting LED arrays for their incandescent lamps.

One effort to configure an LED lighting fixture that utilizes components of prior incandescent lamp lighting fixtures is described in U.S. Patent Application Publication No. 2012/0140463, filed in the name of David Kinzer et al. The disclosed fixture includes a planar array of LEDs mounted at the rear end of an elongated mixing tube assembly, which in turn is mounted to a conventional gate and lens assembly. The mixing tube assembly includes a reflective inner surface having a converging section and diverging section, which function to homogenize the light emitted by the planar LED array. In use, light from the LED array is directed through the mixing tube assembly for mixing, and from there through the gate and lens assembly for projection toward a distant location.

Kinzer's lighting fixture is effective in projecting a high-intensity beam of light using less electrical power than prior incandescent lamp lighting fixtures (30 versus 20 lumens per watt, field efficacy). However, when its design is used as a retrofit of prior incandescent lamp lighting fixtures, it is considered to include an excessive amount of replacement structure and to utilize an unduly small proportion of the prior fixtures, i.e., only the gate and lens assemblies of such prior fixtures. As a retrofit, this design is not considered to be particularly cost-effective and it cannot be easily installed with the fixture in situ. The Kinzer fixture also has poor soft focus characteristics because it images the LED array in the far field.

It should, therefore, be appreciated that there remains a need for a more cost-effective way to retrofit prior incandescent lamp lighting fixtures for use with LED light sources. In particular, there is a need for an LED light source assembly that can be combined with a greater proportion of such prior incandescent lamp lighting fixtures. The present invention fulfills this need and provides further related advantages.

SUMMARY OF THE INVENTION

The present invention is embodied in a light source assembly configured for attachment to a lighting fixture of a type having a concave reflector and, typically, a lens assembly for projecting light received from the concave reflector forward along a longitudinal fixture axis. The light source assembly includes three or more light-emitting diode (LED) assemblies; a heat sink; an elongated support having a rearward end operatively connected to the heat sink and a forward end that mounts the three or more LED assemblies and that defines a longitudinal light source axis; and a fastener assembly configured for attachment to the lighting fixture. When attached to the lighting fixture, the heat sink is located on the backside of the concave reflector and the forward end of the elongated support extends through the central opening of the reflector, such that the light source axis is substantially aligned with the fixture axis and the three or more LED assemblies are located at or near a focal region of the concave reflector. In operation, with the light source assembly attached to the lighting fixture, light emitted from the three or more LED assemblies is reflected by the concave reflector to the lens assembly, which in turn projects the light forward along the longitudinal axis, and heat generated by the LED assemblies is conducted rearward along the elongated support to the heat sink.

In one preferred embodiment of the invention, the elongated support includes a heat pipe having a single elongated, hermetically sealed interior cavity extending from the support's forward end to its rearward end. In this embodiment, the heat pipe preferably includes a graded, sintered powder wick in its interior cavity, the wick having relatively large porosity adjacent the heat pipe's rearward end and relatively fine porosity adjacent the heat pipe's forward end. In one form, the heat pipe includes a forward end cap at its forward end and a rearward tube at its rearward end, which are secured together to form the interior cavity. The outer surface of the forward end cap defines three or more substantially flat surfaces, each sized and configured to support a planar substrate of a separate one of the three or more LED assemblies. In another form, the elongated support further includes a sleeve having a central opening sized to fit conformably over the forward end of the heat pipe, the sleeve having an outer surface that defines three or more substantially flat surfaces, each sized and configured to support a planar substrate of a separate one of the LED assemblies.

In another preferred embodiment, the elongated support includes a forward heat pipe and a plurality of rearward heat pipes, each such heat pipe having a forward end and a rearward end. In addition, a heat-transfer block thermally connects the rearward end of the forward heat pipe to the forward ends of the plurality of rearward heat pipes. The forward end of the forward heat pipe mounts the three or more LED assemblies, and the rearward ends of the plurality of rearward heat pipes all connect to the heat sink. In addition, the rearward ends of the plurality of rearward heat pipes have longitudinal axes arranged substantially parallel with the longitudinal light source axis and they connect to the heat sink at spaced-apart locations.

In other, more detailed features of the invention, each of the three or more LED assemblies includes a plurality of LEDs arranged in one or more rows (preferably two or more rows), with their axes substantially parallel with the longitudinal light source axis. When two or more rows are provided, the LEDs in adjacent rows preferably are arranged in a staggered relationship relative to each other, to improve the far-field integration of the light projected by the fixture. In addition, each of the LED assemblies preferably includes a separate light-transmissive dome of silicone (or other material having a high refractive index) disposed over each LED.

In yet other more detailed features of the invention, the three or more LED assemblies are substantially identical to each other and each mount their LED(s) on a substantially planar substrate. The assemblies also are arranged substantially symmetrically around the elongated support's forward end, to improve far-field integration. At least one of the three or more LED assemblies preferably further includes a temperature sensor mounted at the substrate's forward end. Each of the LED assemblies also preferably further includes a connector for receiving electrical power, and preferably further includes a light-reflective barrier disposed between the connector and the LEDs. Alternatively, each LED assembly can further include an electrical connection spaced from the substrate. In addition, each LED assembly is bonded to the underlying forward end of the elongated support by a layer of conventional solder, thermal epoxy, or, most preferably, a special aluminum/nickel Nanofoil® material, in which case the final bonding layer would incorporate aluminum and nickel.

In yet another more detailed feature of the invention, the fastener assembly for attaching the light source assembly to the lighting fixture can include a screw sized and configured to engage a threaded socket in the lighting fixture. The fastener assembly also can include adjustment means for controllably moving the elongated support along the lighting fixture's longitudinal axis, to position the three or more LED assemblies relative to the focal region of the concave reflector, and thereby adjust the distribution of the projected light.

In still another optional feature of the invention, the heat sink includes a plurality of fins and the light source assembly further includes a fan for directing cooling air across the heat sink fins. The fan preferably extends rearward beyond the rearward end of the elongated support.

In an alternative form, the invention also is embodied in an overall lighting fixture that incorporates a light source assembly having the features summarized above.

Other features and advantages of the invention should become apparent from the following description of the preferred embodiment, taken in conjunction with the accompanying drawings, which depict, by way of example, the principles of the invention.

BRIEF DESCRIPTION OF THE DRAWINGS

FIG. 2A is a top front isometric view of the first LED light engine embodiment of the lighting fixture of FIG. 1, the embodiment including a single heat pipe assembly having a forward end that mounts four evenly spaced planar arrays of LEDs and a rearward end that is operatively connected to a parallel-fin heat sink.

FIG. 2B is a top elevational view of the first LED light engine embodiment of FIG. 2A.

FIG. 2C is a detailed top front isometric view of the four LED arrays mounted at the forward end of the heat pipe assembly of FIG. 2A.

FIG. 2D is a detailed front elevational view of the four LED arrays mounted at the forward end of the heat pipe assembly of FIG. 2C.

FIGS. 3A and 3B are a side elevational view and a side sectional view, respectively, of the heat pipe assembly of FIG. 2A.

FIGS. 5A, 5B, and 5C are a top front isometric view, a top plan view, and a side elevational view, respectively, of one of four identical arrays of LEDs in the LED light engine embodiment of FIG. 2A.

FIG. 5D is a top front isometric view of one LED array, similar to the isometric view of FIG. 7A, but with the silicone domes overlaying the LEDs removed.

FIG. 7A is a top front isometric view of the heat pipe assembly and heat sink assembly portion of a second LED light engine embodiment configured for use with the lighting fixture of FIG. 1, in place of the first light engine embodiment. This second embodiment includes five evenly spaced LED arrays mounted at the forward end of a heat pipe assembly that includes a forward heat pipe, four rearward heat pipes, and an intermediate heat-transfer block.

FIGS. 7B, 7C, 7D, and 7E are a front elevational view, a top plan view, a side elevational view, and a rear elevational view, respectively, of the second LED light engine embodiment of FIG. 7A.

FIGS. 8A, 8B, and 8C are a top front isometric view, a front elevational view, and a side elevational view, respectively, of a mounting sleeve that mounts onto the forward end of the heat pipe assembly of FIG. 7A and that supports five LED arrays in a symmetrical pattern around the heat pipe assembly.

FIGS. 9A, 9B, and 9C are a top front isometric view, a front elevational view, and a side elevational view, respectively, of the intermediate heat-transfer block that is a part of the second light engine embodiment of FIG. 7A.

DESCRIPTION OF THE PREFERRED EMBODIMENTS

Figure 1:
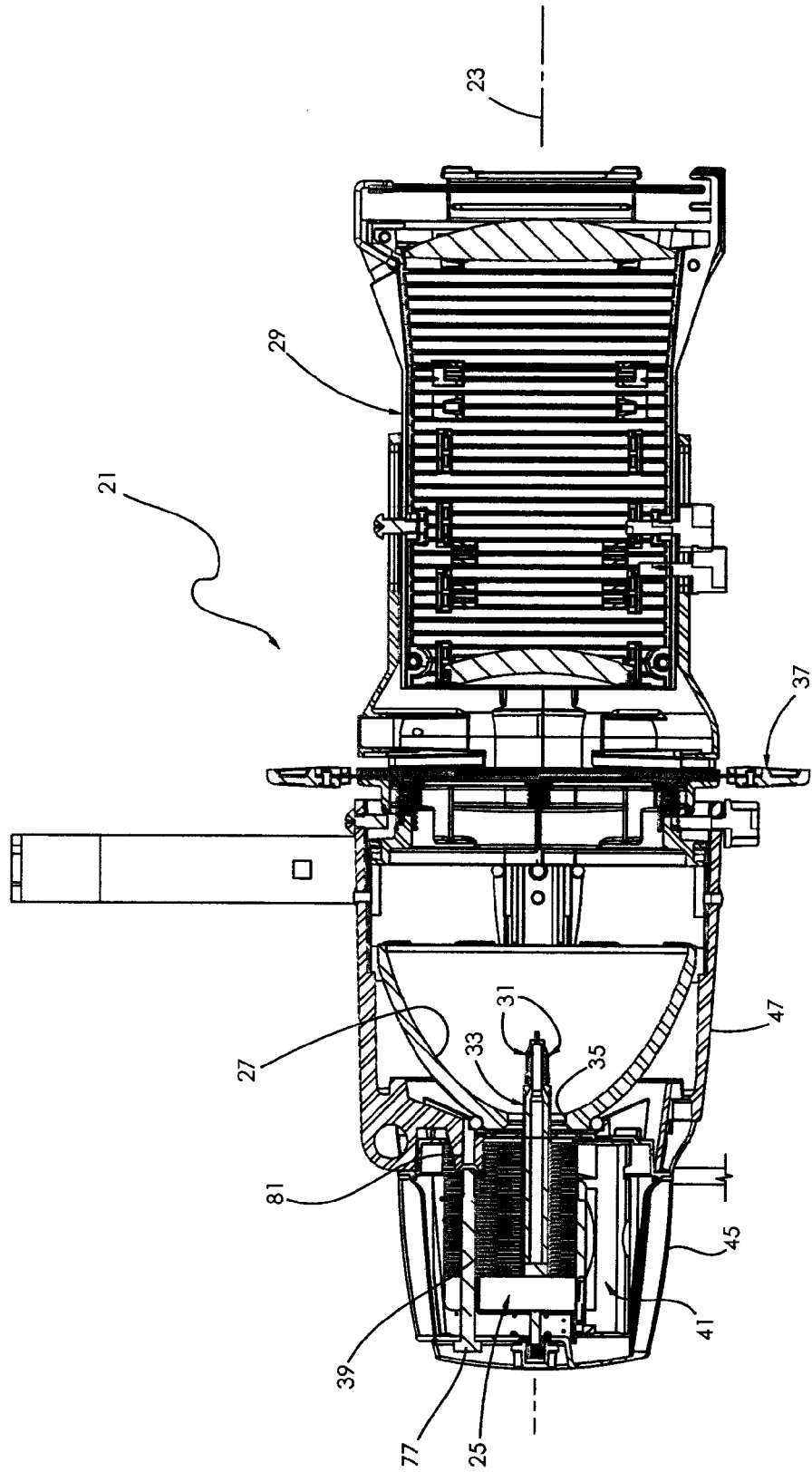
FIG. 1 is a side sectional view of a lighting fixture embodying the invention, for projecting a high-intensity beam of light, the lighting fixture incorporating a first LED light engine embodiment.

With reference now to the accompanying drawings, and particularly to FIGS. 1 and 2A, there is shown a theater lighting fixture 21 for projecting a beam of light along a longitudinal fixture axis 23 toward a distant location, e.g., a theater stage. The fixture includes a first embodiment of an LED light engine 25 at its rearward end, a substantially ellipsoidal reflector 27 for reflecting light emitted by the LED light engine, and a lens assembly 29 for projecting light reflected by the reflector. The LED light engine 25 (see FIG. 2A) includes four LED assemblies, or arrays, 31 mounted at the forward end of an elongated heat pipe assembly 33. The LED light engine 25 is mounted behind the backside of the reflector 27, with the heat pipe assembly's forward end projecting through a central opening 35 in the reflector, such that the LED arrays are located substantially at the near focal region of the reflector's two focal regions. Light emitted by the LED arrays is reflected by the reflector toward its other, far focal region, which is located at the rearward end of the lens assembly 29. The lens assembly, in turn, projects the light along the longitudinal fixture axis 23 toward the distant theater stage. In this embodiment, the longitudinal fixture axis is aligned with the central axis of the substantially ellipsoidal reflector. As in conventional incandescent lighting fixtures, a gate assembly 37 is located at the site of the reflector's second, far focal region, such that a selected shape or image can be formed at theater stage.

FIGS. 2A-2D are detailed views of the LED light engine 25 of FIG. 1. The light engine includes the elongated heat pipe assembly 33, a heat sink assembly 39 that connects to the heat pipe assembly's rearward end, and a fan 41 for directing cooling air across the heat sink assembly's parallel fins 43. The heat pipe assembly, the heat sink assembly, and the fan all are supported within a cast, or molded, rear housing 45 (FIG. 1), which is configured to mate with a cast reflector housing 47 of the lighting fixture 21. The rear portion of the heat pipe assembly 33 extends perpendicularly through a mid-portion of the heat sink assembly 39, with a heat-transmissive connection to each of the heat sink's parallel fins 43. The forward end of the heat pipe assembly projects forward from the heat sink assembly along a longitudinal light source axis 49, and it includes a forward end cap 51 that supports the four LED arrays 31. This is best shown in FIG. 2C.

When the LED light engine 25 is mounted behind the back side of the reflector 27, the forward end of the heat pipe assembly 33 projects through the reflector's central opening 35 such that the light source axis 49 is aligned with the fixture axis 23 and the LED arrays 31 are located substantially at the reflector's near focal region. Electrical circuitry (not shown) for powering the LED arrays can be located in the space between the heat sink assembly 39 and the rear housing 45 or, alternatively, in the annular space between the reflector and the reflector housing 47.

Figure 4B:
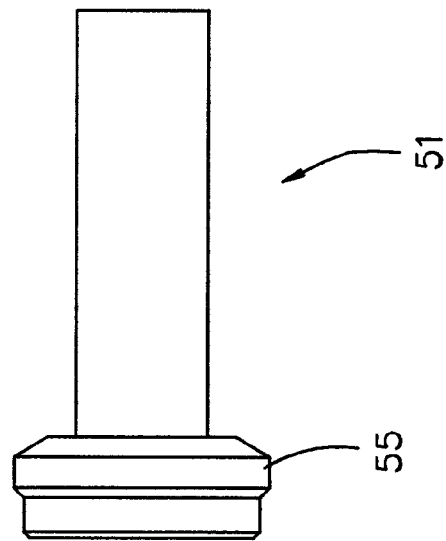
FIGS. 4A, 4B, and 4C are a top front isometric view, a side elevational view, and a rear elevational view, respectively, of the forward end cap portion of the heat pipe assembly of FIG. 2A.
Figure 4A:
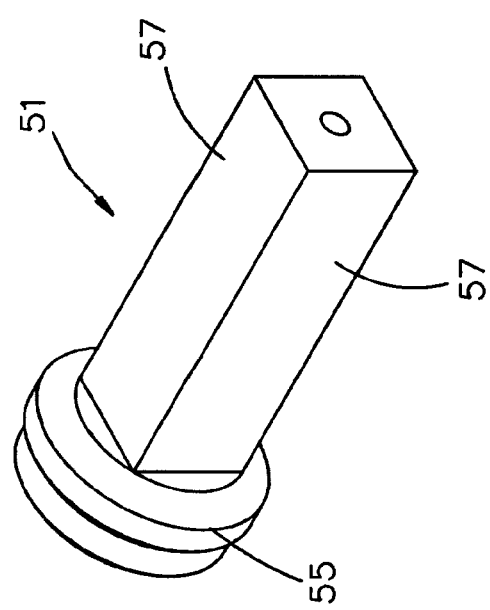
Figure 4C:
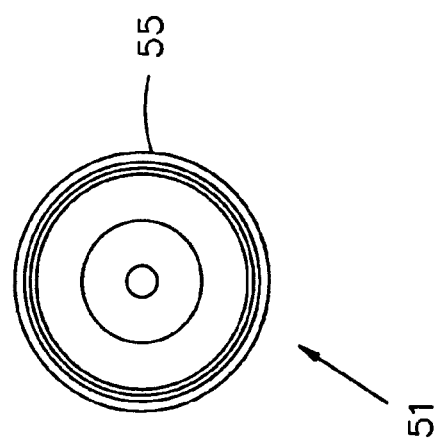

FIGS. 3A and 3B are detailed views of the heat pipe assembly 33. In addition to the forward end cap 51, the heat pipe assembly includes an elongated rearward tube 53, which is brazed to the end cap's open, rearward end. The end cap and rearward tube both are formed of a material having high thermal conductivity, preferably oxygen-free copper (C10100). The rearward tube has a cylindrical cavity extending along its entire length, and the forward end cap has a cylindrical cavity of smaller diameter extending along its length, thus forming a single elongated cavity. A flange 55 at the forward end cap's open rearward end is configured to mate with the rearward tube's open forward end, to facilitate a reliable, hermetic connection between the two components. The forward end cap 51 (see FIGS. 4A-4C) preferably is formed by machining or, alternatively, forging. It includes four planar, rectangular faces 57 of identical size, each configured to support a separate one of the four LED arrays 31. The flatness of these faces is an important factor in providing a good thermal interface with the overlaying LED arrays.

A sealing plug 59 is brazed to the rearward end of the rearward tube 53, and a small diameter filling tube 61 seals the forward end of the forward end cap 51. This defines within the heat pipe assembly 33 a single, elongated, hermetically sealed interior cavity. The sealing plug is approximately aligned with the rearward-most fin 43 of the heat sink assembly 39, and it can have a range of thickness (~1 to 6 mm). A thicker plug transmits heat to the rearward-most fin by conduction, and it effectively enables the interior cavity to be shortened, thus enhancing the heat pipe assembly's heat-carrying capacity. The interior cavity is evacuated to a reduced pressure, and it includes a specified amount of a working fluid, preferably deionized water, which is introduced through the filling tube before the filling tube is sealed by crimping and brazing.

A copper-powder wick 63 is sintered to the wall of the heat pipe assembly's interior cavity, to enhance the transport of condensed water via capillary action from the heat pipe assembly's rearward end to its forward end. Preferably, the copper powder has a graded pore size, with relatively large pores at the cavity's rearward end and relatively fine pores at the cavity's forward end. A boundary line between the large porosity region and the fine porosity region is represented by the reference numeral 65 in FIG. 3B. Of course, additional levels of pore size gradation also could be provided.

The heat pipe assembly 33 effectively transfers unwanted excess heat generated by the four LED arrays 31 backward to the heat sink assembly 39 for dissipation. Excess heat generated by the LEDs arrays evaporates the working fluid at the heat pipe assembly's forward end, i.e., within the forward end cap 51, and the vapor flows rapidly to the heat pipe assembly's rearward end, i.e., in the region of the heat sink assembly, where it condenses to liquid form. The liquid then travels forward along the heat pipe assembly's copper powder wick 63 back to the region of the LED arrays. This operation is conventional, and those skilled in the art will know how to size the heat sink assembly 39 and the fan 41 to properly handle the amount of heat to be dissipated. Worst case conditions occur (1) when the lighting fixture 21 is oriented to project the light beam in a vertically upward direction, requiring the heat pipe liquid to wick in the same upward direction; (2) when the fixture's gate assembly 37 is closed, reflecting light back via the reflector 27 to the LED arrays 31; and (3) when the fixture's ambient temperature is low, increasing the viscosity of the heat pipe liquid.

In an alternative embodiment (not shown in the drawings), the heat pipe could be formed from just a single tubular component, by swaging its forward end to a reduced diameter and then soldering onto that forward end a machined or forged sleeve having a generally polygonal shape, with each face of the polygon sized to receive a separate LED array. Alternatively, the polygonal shape could be formed by deep-drawing or forging directly into the heat pipe's reduced diameter forward end. Further, the heat pipe could even be substituted by a high-conductivity rod. That latter embodiment is not preferred, however, because its thermal conductivity and capacity would be sharply reduced.

FIGS. 5A-5D depict one of the four identical LED arrays 31. The depicted array includes twelve LEDs 67 (FIG. 5D) mounted in two adjacent rows on a rectangular printed circuit board substrate 69. The two adjacent rows of LEDs 67 are positioned close to the centerline of the substrate 69, so that the LEDs are as close as possible to the longitudinal light source axis 49, which aligns with the longitudinal fixture axis 23 when the LED light engine 25 is installed. In addition, as best shown in FIG. 5B, the LEDs in each row are staggered relative to those in the adjacent row. A layer of silicone overlays both rows of LEDs, forming a transparent dome 71 over each LED. These domes increase the LEDs' luminous efficacy and help to integrate the light emitted by the LEDs, thereby enhancing the distribution of light in the projected beam.

The substrate 69 is sized to fit over one of the four planar, rectangular faces 57 of the forward end cap 51 of the heat pipe assembly 33. Each substrate may overhang one side of its underlying face (as best shown in FIG. 2D), to increase the electrical isolation between the conductive traces and the heat pipe assembly. The substrates preferably are formed of aluminum nitride or, alternatively, copper with a thin, dielectric layer having high heat conductivity.

A temperature sensor in the form of an NTC (negative temperature coefficient) thermistor 73 is mounted at the forward end of the substrate 69. This thermistor has a resistance whose value varies with temperature, and a measurement of this resistance is used by a control system (not shown) to monitor the LED array's temperature and prevent excessive overheating. The thermistor preferably is located at the substrate's forward end, which is the site where an excessive thermal load could initially bring about a partial "dry out" of the heat pipe assembly's working fluid, i.e., deionized water, and thus cause a rapid rise in temperature. The thermistor need be mounted on only one of the four LED arrays 31, although additional thermistors could be provided for redundancy.

An electrical connector 75 is mounted at the base end of the substrate 69, to receive a mating connector (not shown) that delivers electrical power to the LEDs 67 and that transmits back to the control system a signal representing the resistance value measured by the thermistor 73. Just a single four-wire cable (not shown) is required, with short jumper cables (not shown) interconnecting the four LED arrays 31. The LEDs of the four arrays all are connected in series with each other, so the power line in the four-wire cable connects to the connector on a first of the arrays, and each array in succession receives its power via a jumper cable connected to the previous array. Return power is provided to the four-wire cable from the connector on the last of the four arrays. Two wires in the cable for carrying the temperature measurement value can connect to whichever of the four arrays carries the thermistor 73. A connector of this kind is preferred to a conventional soldered wire or preformed connection, which could damage the adjacent LEDs with solder flux during attachment.

A light-reflective thermal barrier (not shown in the drawings) can be positioned between the LEDs 67 and the connector 75, to reduce the connector's absorption of light, which could lead to its premature failure. One suitable material for such a thermal barrier is aluminum oxide, having a theoretical density of about 94-99%.

Further, suitable alternatives to the use of the connector 75 include the use of wire-wrap posts, insulation displacement connectors, and localized soldering, e.g., soldering to the remote ends of L-shaped preforms. All of these alternative approaches space the electrical connection from the underlying substrate.

The twelve LEDs 67 in each LED array 31 are configured to emit substantially white light, or colored light, in a generally Lambertian pattern, such that the arrays combine to emit light in a generally uniform circumferential pattern. This feature, coupled with the staggering of the LEDs in adjacent rows and the silicone domes 71, cooperate with the conventional circumferential faceting in the reflector 27 to help ensure that the projected beam has an intensity that is substantially uniform circumferentially and is devoid of dark areas. Alternatively, the LEDs in adjacent rows could have two or more different white light color temperatures and/or colors, which would be integrated by the reflector facets.

In the particular case of the Source Four® incandescent lighting fixture sold by Electronic Theatre Controls, Inc., of Middleton, Wis., the reflector's facets are sized to blend light emitted by lamp filaments spaced apart from each other by about 4.0 mm. These same facets should be equally effective in blending light emitted by the LED arrays 31 if the spacing between the LEDs 67 of adjacent arrays is no more than 4.0 mm, edge-to-edge.

In an alternative embodiment (not shown in the drawings), multiple arrays of LEDs could be mounted on just a single, non-planar printed circuit board substrate. In that embodiment, each array emits light having a peak intensity substantially perpendicular to the array, and the multiple arrays are oriented relative to each other such that they combine to emit light in a circumferential pattern that is substantially uniform.

The fan 41 (FIG. 2B) is shown to extend rearward of the rearward-most fin 43 of the heat sink assembly 39. Airflow is blocked for this portion of the fan, without detracting significantly from the fan's effectiveness. This allows the heat pipe assembly 33 to be shortened, thus enhancing its thermal capacity (as discussed below).

The fan 41 is depicted as being located on the lower side of the heat sink assembly 39, for directing cooling air through the parallel fins 43. Other orientations for the fan could alternatively be provided. In addition, in an alternative embodiment not shown in the drawings, a larger heat sink assembly could be used to eliminate the need for a fan. Other methods of forced-air cooling also could be used, including synthetic jets (e.g., Nuventix SynJet products). The heat sink also could be configured to extend forwardly into the annular space between the lighting fixture's concave reflector and reflector housing.

With reference again to FIG. 1, it can be seen that the LED light engine 25 attaches near the back side of the lighting fixture's reflector 27 using a single elongated machine screw 77. The screw engages a threaded socket 79 formed in the cast reflector housing 47. This is the same socket as is used to attach an incandescent lamp light engine previously used with the fixture 21. Holes 81 (see FIG. 2A) are formed in the parallel fins 43 of the heat sink assembly 39, to accommodate the screw. Triangular-shaped cutouts in the forward-most fins of the heat sink assembly (see FIG. 2A) provide a nesting fit with structure supporting the backside of the reflector and minimize air leakage from the heat sink assembly 39. In addition, the LED light engine's rear housing 45 is specially configured to mate with the fixture's cast reflector housing 47, so as to minimize the rearward escape of stray light emitted by the LED arrays 31. Those skilled in the art will appreciate that many alternative techniques for attaching the LED light engine to the reflector and reflector housing also could be used.

It is important to note that the only new structure in the lighting fixture 21 of FIG. 1 is the LED light engine 25. The remaining structure, including the reflector 27, the gate assembly 37, and the lens assembly 29, all is of conventional design, used with an incandescent lamp. Moreover, the LED light engine 25 can be attached as a retrofit to a conventional incandescent lamp lighting fixture, simply by substituting it for the prior incandescent lamp light engine. This makes the LED light engine an easily installed, economically viable alternative to the LED lighting fixture described in the Kinzer patent application publication identified above.

Figure 6A:
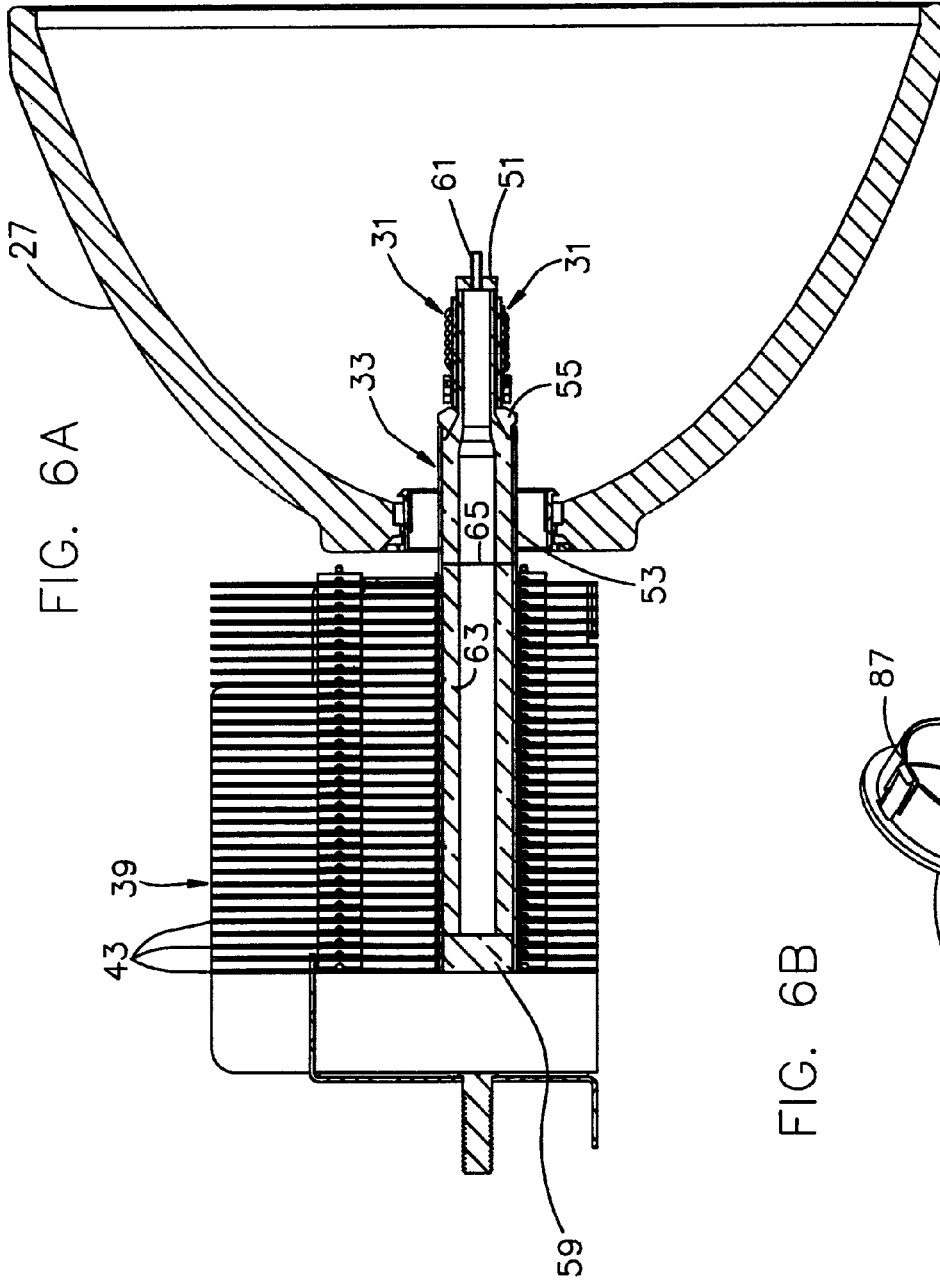
FIG. 6A is a detailed side cross-sectional view of the concave reflector of the lighting fixture of FIG. 1, with the heat pipe assembly and heat sink assembly of the LED light engine shown in its mounted position.
Figure 6B:
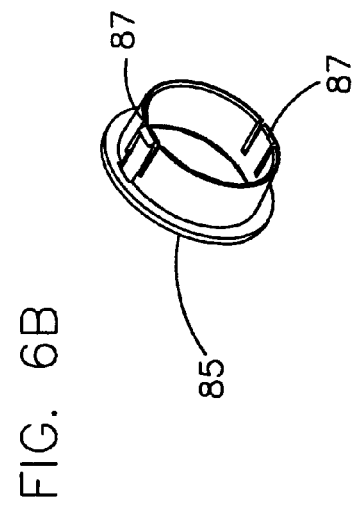
FIG. 6B is a detailed isometric view of a protective sleeve that mounts in the central opening of the concave reflector in FIG. 6A, to protect the LED light engine's LED arrays during installation.

When installing the LED light engine 25 as a retrofit in the lighting fixture 21 of FIG. 1, or when simply substituting a new LED light engine for a previous one that has failed, it is important to avoid damaging the LEDs 67 and silicone domes 71 in the four LED arrays 31. This is a particular issue when they are being inserted through the central opening 35 in the fixture's reflector 27, which can be highly abrasive from having been drilled out. To this end, and as shown in FIGS. 6A-6B, a protective sleeve 85 is first placed into the opening. The sleeve is formed of nylon, Teflon, or other soft material, and it includes conventional spring tabs 89 to facilitate a snap fit. To provide even further protection for the LEDs and the silicone domes, the front periphery of the heat sink assembly 39 could carry an annular guide panel (not shown) configured to engage portions of the reflector housing 47 and thereby provide a coarse centering of the heat pipe assembly 33 relative to the reflector's central opening 35 during installation.

With reference now to FIGS. 7A-7E, there is shown a second embodiment of an LED light engine 89 that can be mounted at the rearward end of the lighting fixture 21 of FIG. 1, in place of its original incandescent lamp light engine (not shown). This second embodiment includes five LED arrays 31, a heat pipe assembly 91, a heat sink assembly 93, and a fan (not shown in the drawings, but similar to the fan of FIGS. 2A-2B). Each LED array can be configured in the same way as is described above with reference to FIGS. 5A-5D.

The heat pipe assembly 91 includes a forward heat pipe 95, four rearward heat pipes 97, and an intermediate heat-transfer block 99. In addition, a machined, mounting sleeve 101 having five equally sized faces 103 (see FIGS. 8A-8C) is soldered or brazed onto the forward heat pipe 95, and the five LED arrays 31 are mounted individually on these faces. The heat pipes 95, 97, the mounting sleeve 103, and the heat-transfer block 99 preferably all are formed of a material having high heat conductivity, e.g., oxygen-free copper (C10100).

As best shown in FIGS. 9A-9C, the heat-transfer block 99 includes a forward aperture 105 for conformably receiving the rearward end of the forward heat pipe 95 and four additional apertures 107 for conformably receiving the forward ends of the four rearward heat pipes 97. The heat-transfer block and the heat pipes are soldered together, to form an assembly that provides excellent heat transfer between the forward and rearward heat pipes. An additional aperture 109 is provided for carrying a cable (not shown) that provides electrical power for the LED arrays 31 (FIG. 5A) and that transmits a signal representing the resistance value measured by the thermistor 73 (FIG. 5A).

In an alternative embodiment (not shown in the drawings), the heat-transfer block can take the form of a mass of heat-conductive solder or epoxy deposited into the interstices between adjacently positioned forward and rearward heat pipes.

The four rearward heat pipes 97 all extend rearward from the heat-transfer block 99 along axes perpendicular to the parallel fins 111 of the heat sink assembly 93. The heat pipes are individually soldered to the fins at spaced-apart locations, and thus function effectively to transfer heat from the heat-transfer block to the heat sink assembly. This provides better heat transfer to the heat sink assembly than would embodiments having just a single rearward heat pipe. Other orientations for the four rearward heat pipes, or a different number of rearward heat pipes, could alternatively be provided. The forward heat pipe 95 and the rearward heat pipes 97 preferably all are of conventional, off-the-shelf design. As with the first embodiment, those skilled in the art will know how to size the heat pipe assembly 91, the heat sink assembly 93, and the fan to properly handle the amount of heat to be dissipated.

In another alternative embodiment (not shown in the drawings), the forward heat pipe could be forged to a polygonal shape, with a separate LED array 31 mounted on each face of the polygon. This would eliminate the need for the separate mounting sleeve 101.

The aluminum-nitride substrate 69 of each LED array 31 can be reliably bonded to one face 57 of the forward end cap 51 (FIG. 4A) or mounting sleeve 101 (FIGS. 8A-8C) using a high-temperature solder (e.g., SAC 305), a low-temperature solder (e.g., tin-lead, indium-silver, or tin-bismuth) to prevent reflow of the fin solder, or a B-staged heat-conductive epoxy material (e.g., AiT RT 8550).

Figure 10A:
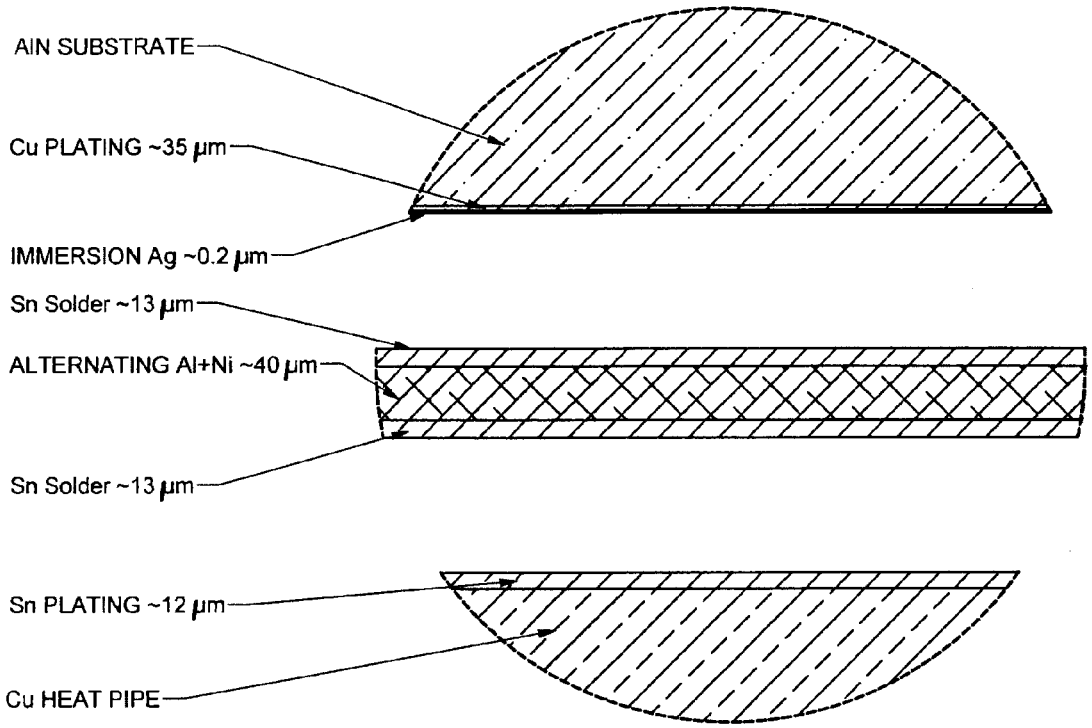
FIG. 10A is a schematic cross-sectional view of the layers that are used to bond the substrate of one LED array to the underlying copper heat pipe, the view being before bonding occurs.
Figure 10B:
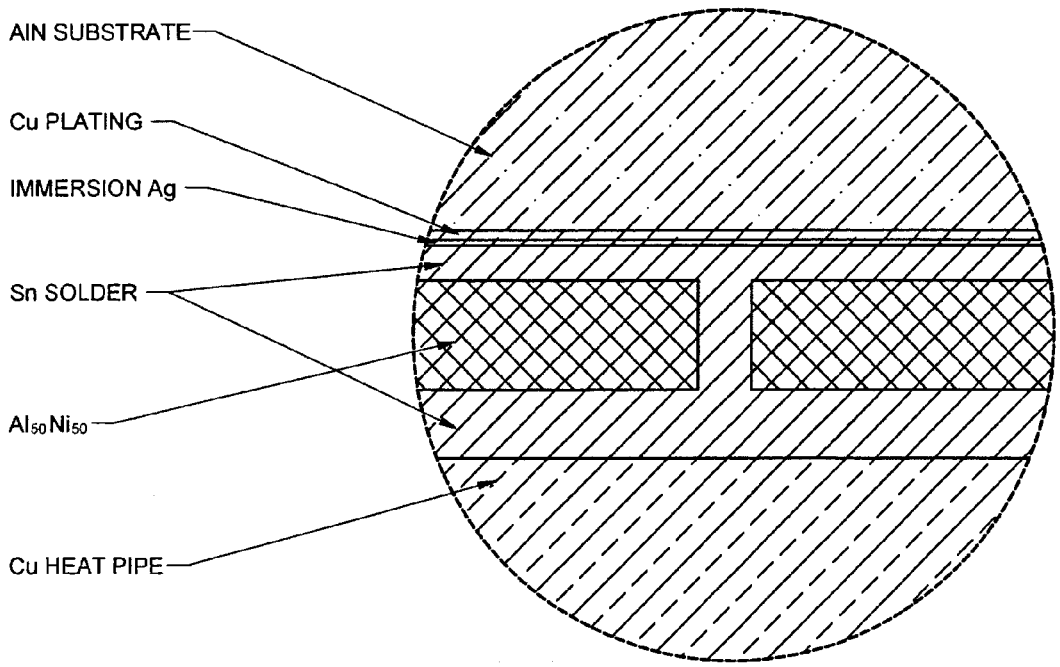
FIG. 10B is a schematic cross-sectional view of the same layers as FIG. 10A, but after bonding has occurred.

The preferred bonding technique, however, is shown schematically in FIGS. 10A-10B. It uses a special Nanofoil® material available from The Indium Corporation of America, of Utica, N.Y. The Nanofoil® material comprises alternating layers of nickel and aluminum, in a combined thickness of about 40 microns. This material has a coating of tin (or other solder) on both of its sides, and it is sandwiched between the overlying aluminum-nitride substrate 69 and the underlying end cap 51 (or mounting sleeve 101). The substrate's copper-plated undersurface bears a thin (~0.2 micron) immersion silver film, and the end cap's (or mounting sleeve's) outer surface bears a thin (~12 micron) tin plating layer.

The Nanofoil® material, when initiated by a heat pulse delivered from a laser pulse, electric spark, etc., undergoes a self-sustaining exothermic reaction. This produces an intermetallic compound of nickel aluminide, in solid and liquid phase only, without releasing any gas. The rapidity of the reaction (~10 msec.) enables the bonding to be completed before the underlying heat pipe assembly 33 (or 91) can dissipate the heat. This approach also allows LED arrays 31 to be attached sequentially, and it eliminates the need to heat the entire heat sink assembly 39 and the need for a complex assembly fixture, as would be required for conventional solder or thermal epoxy. After the reaction has been completed, the nickel-aluminide densifies, to allow the tin from the Nanofoil's upper and lower surfaces to form a strong, gap-free bond, as shown in FIG. 10B.

Figure 12:
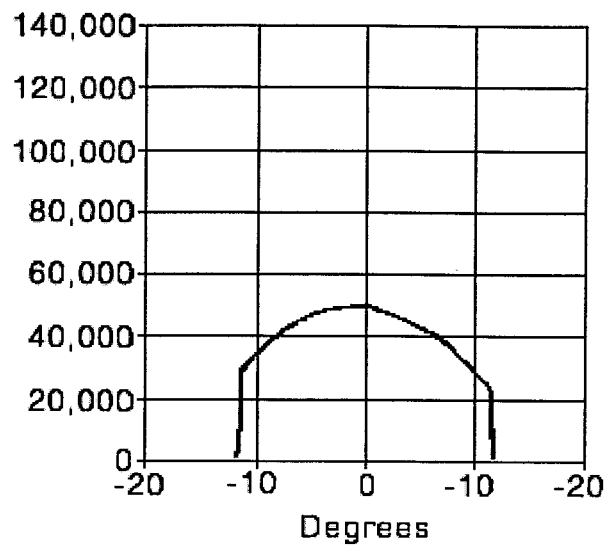
FIG. 12 is a schematic view of the fixed light intensity field pattern produced by a typical prior art lighting fixture incorporating an LED light engine.
Figure 11A:
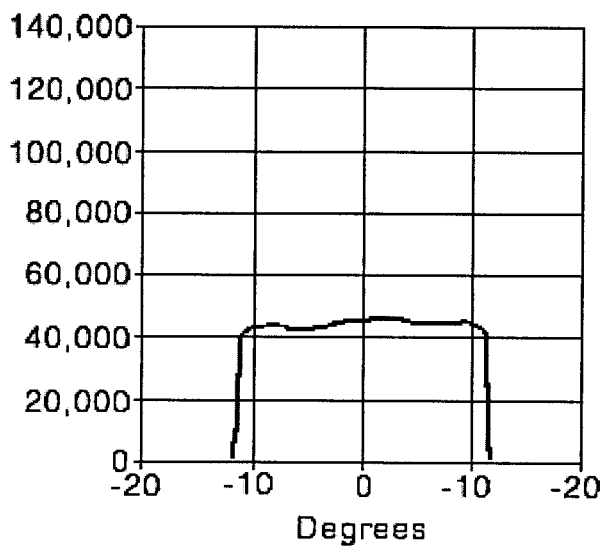
FIGS. 11A and 11B are schematic views of the light intensity field patterns produced by the lighting fixture of FIG. 1, incorporating an LED light engine in accordance with the invention, adjusted to provide a flat field and a peak field, respectively.
Figure 11B:
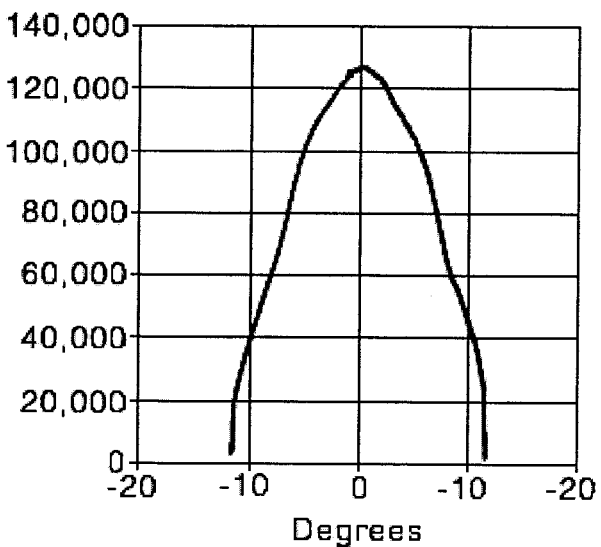

With reference again to FIG. 1, the LED light engine 25 (or 89) is configured to provide for a controlled adjustment of the distribution pattern of the projected light beam, ranging from a flat field (FIG. 11A) to a peak field (FIG. 11B). This contrasts with the fixed distribution pattern (see FIG. 12) provided by the LED lighting fixture described in the Kinzer patent application publication identified above. This field adjustment is accomplished by moving the entire LED light engine axially relative to the reflector 27, which in turn moves the LED arrays 31 axially relative to the reflector's near focal region. The controlled movement is achieved using a threaded stud 113 projecting rearward from the rear side of the heat sink assembly 39 and a mating threaded socket in a control knob 115 captured on the rear side of the rear housing 45. The threaded stud and the control knob are sized such that manually turning the control knob can move the LED arrays axially as much as 7 mm.

In other embodiments not shown in the drawings, the forward end of the heat pipe assembly, which forms the assembly's evaporator section, could be made by forming the end of a tube into a generally square cross-section (or other polygonal shape) using a suitable deep drawing, forging, or swaging process. In such embodiments, the LED arrays can be mounted directly onto the heat pipe's formed faces.

In still other embodiments not shown in the drawings, a closed-loop cooling system could be substituted for the various heat pipe assemblies described above. Such a cooling system would channel a working liquid through a closed-loop path, picking up heat from the LED arrays and delivering it to a heat sink before returning along a separate path back to the LED arrays. Such a closed-loop system would likely be more complex than a heat pipe system, but could be even more effective in conducting heat away from the LED arrays.

In yet other embodiments not shown in the drawings, the lighting fixture's concave reflector could itself function as a heat sink for the LED light engine. This could take the form of metallic fins built-in to the reflector's backside.

In all of the embodiments described above, the LED arrays preferably number at least three, and they are arranged symmetrically around the longitudinal light source axis, which aligns with the lighting fixture's longitudinal fixture axis when the LED light engine is installed. This minimizes the possibility of dark regions in the projected light beam.

It should be appreciated from the foregoing description that the present invention provides an improved LED light engine configured to be retrofit to prior incandescent lamp lighting fixtures. The improved LED light engine effectively places its LED arrays in a compact arrangement substantially coincident with the a focal region of the fixture's concave reflector such that the reflector can efficiently collect and utilize the light emitted by the LEDs. In addition, the LED light engine's configuration allows a significant proportion of the prior lighting fixture to continue to be utilized, leading to substantial cost saving. Numerous embodiments and alternative configurations for the light engine's heat pipe assembly and heat sink assembly are described. Those skilled in the art will appreciate that various features of each disclosed embodiment can be combined with various features of other embodiments.

Although the invention has been described in detail with reference only to the presently preferred embodiments, those skilled in the art will appreciate that various modifications can be made without departing from the claimed invention. Accordingly, the invention is defined only by the following claims.

I claim:

1. A light source assembly configured for attachment to a lighting fixture of a type having a concave reflector and projecting light forward along a longitudinal fixture axis, wherein the concave reflector includes a central opening aligned with the longitudinal fixture axis, the light source assembly comprising:
    three or more LED assemblies;
    a heat sink;
    a heat pipe assembly having a forward end that mounts the three or more LED assemblies and a rearward end connected directly to the heat sink, wherein a portion of the heat pipe assembly extends through the central opening of the concave reflector and defines a longitudinal light source axis, and wherein the heat pipe assembly further has a single elongated, hermetically sealed interior cavity extending along substantially its entire length, with a transverse dimension that is relatively small at its forward end, adjacent to the LED assemblies, and relatively large at its rearward end, adjacent to the heat sink; and
    a fastener configured for attachment to the lighting fixture, with the heat sink located rearward of the concave reflector, with the light source axis aligned with the fixture axis, and with the three or more LED assemblies located at or near a focal region of the concave reflector;
    wherein, in operation, with the light source assembly attached to the lighting fixture, light emitted from the three or more LED assemblies is reflected by the concave reflector and projected forward along the longitudinal fixture axis, and heat generated by the LED assemblies is conducted rearward along the heat pipe assembly to the heat sink.

2. The light source assembly as defined in claim 1, wherein:
    each of the three or more LED assemblies includes a substantially planar substrate supporting a plurality of LEDs;
    the heat pipe assembly includes a forward end cap at its forward end and a rearward tube at its rearward end;
    the forward end cap and rearward tube are secured together to form the single interior cavity; and
    the outer surface of the forward end cap defines three or more substantially flat surfaces, each surface sized and configured to support the substrate of a separate one of the three or more LED assemblies.

3. The light source assembly as defined in claim 1, wherein:
    each of the three or more LED assemblies includes a substantially planar substrate; and
    the heat pipe assembly further includes a sleeve having a central opening sized to fit conformably over the forward end of the heat pipe assembly, the sleeve having an outer surface that defines three or more substantially flat surfaces, each sized and configured to support the substrate of a separate one of the three or more LED assemblies.

4. The light source assembly as defined in claim 1, wherein each of the three or more LED assemblies includes a substantially planar substrate supporting a plurality of LEDs arranged in one or more rows having axes substantially parallel with the longitudinal light source axis.

5. The light source assembly as defined in claim 4, wherein:
    the concave reflector of the lighting fixture includes circumferential facets;
    each of the three or more LED assemblies includes two or more rows of LEDs, with the LEDs in adjacent rows arranged in a staggered relationship relative to each other; and
    the arrangement of LEDs cooperates with the circumferential facets of the concave reflector such that the lighting fixture projects a beam of light having an intensity that is substantially uniform circumferentially.

6. The light source assembly as defined in claim 1, wherein:
    each of the three or more LED assemblies includes a substantially planar substrate supporting a plurality of LEDs;
    the three or more LED assemblies are substantially identical and separate from each other; and
    the three or more LED assemblies are arranged substantially symmetrically around the heat pipe assembly's forward end.

7. The light source assembly as defined in claim 1, wherein:
    the lighting fixture includes a threaded socket opening rearward; and
    the fastener includes a single screw sized and configured to engage the lighting fixture's threaded socket, with its head located rearward of the heat sink and exposed on the rearward side of the light source assembly.

8. The light source assembly as defined in claim 1, wherein:
the three or more LED assemblies include four identical LED assemblies, each including a substantially planar substrate supporting a plurality of LEDs arranged in two or more rows having axes substantially parallel with the longitudinal light source axis; and
the forward end of the heat pipe assembly defines four planar surfaces, each sized and configured to support a separate one of the four LED assemblies.

9. A light source assembly configured for attachment to a lighting fixture of a type having a concave reflector and projecting light forward along a longitudinal fixture axis, wherein the concave reflector includes a central opening aligned with the fixture axis, the light source assembly comprising:
three or more LED assemblies;
a heat sink;
a heat pipe assembly having a rearward end operatively connected to the heat sink and a forward end that mounts the three or more LED assemblies, wherein a portion of the heat pipe assembly extends through the central opening of the concave reflector and defines a longitudinal light source axis, and wherein the heat pipe assembly includes
a forward heat pipe having a forward end, a rearward end, and a single elongated, hermetically sealed interior cavity,
a plurality of rearward heat pipes, each having a forward end, a rearward end, and a single elongated, hermetically sealed interior cavity, and
a heat-transfer block mounting the rearward end of the forward heat pipe and the forward ends of the plurality of rearward heat pipes,
wherein the forward end of the forward heat pipe mounts the three or more LED assemblies, and the rearward ends of the plurality of rearward heat pipes all connect to the heat sink,
and wherein the transverse dimension of the interior cavity of the forward heat pipe is small relative to the combined transverse dimensions of the interior cavities of the plurality of rearward heat pipes; and
a fastener configured for attachment to the lighting fixture, with the heat sink located rearward of the concave reflector, with the light source axis aligned with the fixture axis, and with the three or more LED assemblies located at or near a focal region of the concave reflector;
wherein, in operation, with the light source assembly attached to the lighting fixture, light emitted from the three or more LED assemblies is reflected by the concave reflector and projected forward along the fixture axis, and heat generated by the LED assemblies is conducted rearward along the heat pipe assembly to the heat sink.

10. The light source assembly as defined in claim 9, wherein the rearward ends of the plurality of rearward heat pipes have longitudinal axes arranged substantially parallel with the longitudinal light source axis and connect to the heat sink at spaced-apart locations.

11. The light source assembly as defined in claim 9, wherein:
each of the three or more LED assemblies includes a substantially planar substrate; and
the heat pipe assembly further includes a sleeve having a central opening sized to fit conformably over the forward end of the forward heat pipe, the sleeve having an outer surface that defines three or more substantially flat surfaces, each sized and configured to support the substrate of a separate one of the three or more LED assemblies.

12. The light source assembly as defined in claim 9, wherein:
the three or more LED assemblies include four identical LED assemblies, each including a substantially planar substrate supporting a plurality of LEDs arranged in two or more rows having axes substantially parallel with the light source axis; and
the forward end of the forward heat pipe defines four substantially flat surfaces, each sized and configured to support a separate one of the four LED assemblies.

13. The light source assembly as defined in claim 12, wherein each of the four LED assemblies includes a solder layer bonding the substantially planar substrate to a separate one of the four substantially flat surfaces at the forward end of the forward heat pipe.

14. The light source assembly as defined in claim 9, wherein each of the three or more LED assemblies includes a substantially planar substrate supporting a plurality of LEDs arranged in one or more rows having axes substantially parallel with the longitudinal light source axis.

15. The light source assembly as defined in claim 14, wherein:
the concave reflector of the lighting fixture includes circumferential facets;
each of the three or more LED assemblies includes two or more rows of LEDs, with the LEDs in adjacent rows arranged in a staggered relationship relative to each other; and
the arrangement of LEDs cooperates with the circumferential facets of the concave reflector such that the lighting fixture projects a beam of light having an intensity that is substantially uniform circumferentially.

16. The light source assembly as defined in claim 9, wherein:
each of the three or more LED assemblies includes a substantially planar substrate supporting a plurality of LEDs;
the three or more LED assemblies are substantially identical and separate from each other; and
the three or more LED assemblies are arranged substantially symmetrically around the forward heat pipe's forward end.

17. The light source assembly as defined in claim 9, wherein:
the lighting fixture includes a threaded socket opening rearward; and
the fastener includes a single screw sized and configured to engage the lighting fixture's threaded socket, with its head located rearward of the heat sink and exposed on the rearward side of the light source assembly.

18. The light source assembly as defined in claim 9, wherein the heat-transfer block includes a forward aperture for conformably receiving the rearward end of the forward heat pipe and a plurality of rearward apertures for conformably receiving the forward ends of the plurality of rearward heat pipes.

19. A lighting fixture comprising:
a concave reflector having a central opening aligned with a longitudinal fixture axis; and
a light source assembly configured for attachment to the concave reflector, the light source assembly comprising three or more LED assemblies,
a heat sink, a heat pipe assembly having a forward end that mounts the three or more LED assemblies and a rearward end connected directly to the heat sink, wherein a portion of the heat pipe assembly extends through the opening of the concave reflector and defines a longitudinal light source axis, and wherein the heat pipe assembly further has a single elongated, hermetically sealed interior cavity extending along substantially its entire length, with a transverse dimension that is relatively small at its forward end, adjacent to the LED assemblies, and relatively large at its rearward end, adjacent to the heat sink, and a fastener configured for attachment to the lighting fixture, with the heat sink located rearward of the concave reflector, with the light source axis aligned with the fixture axis, and with the three or more LED assemblies located at or near a focal region of the concave reflector;

wherein, in operation, with the light source assembly attached to the concave reflector, light emitted from the three or more LED assemblies is reflected by the concave reflector and projected forward along the longitudinal fixture axis, and heat generated by the LED assemblies is conducted rearward along the heat pipe assembly to the heat sink.

20. A light source assembly configured for attachment to a lighting fixture of a type having a concave reflector and projecting light forward along a longitudinal fixture axis, wherein the concave reflector includes a central opening aligned with the longitudinal fixture axis, and wherein the lighting fixture further includes a threaded socket opening rearward, the light source assembly comprising:

three or more LED assemblies;

a heat sink;

a heat pipe assembly having a forward end that mounts the three or more LED assemblies and a rearward end connected directly to the heat sink, wherein a portion of the heat pipe assembly extends through the central opening of the concave reflector and defines a longitudinal light source axis, and wherein the heat pipe assembly further has one or more elongated, hermetically sealed interior cavities, with a transverse dimension that is relatively small at its forward end, adjacent to the LED assemblies, and relatively large at its rearward end, adjacent to the heat sink; and a fastener configured for attachment to the lighting fixture, with the heat sink located rearward of the concave reflector, with the light source axis aligned with the fixture axis, and with the three or more LED assemblies located at or near a focal region of the concave reflector, wherein the fastener includes a single screw sized and configured to engage the lighting fixture's threaded socket, with its head located rearward of the heat sink and exposed on the rearward side of the light source assembly;

wherein, in operation, with the light source assembly attached to the lighting fixture, light emitted from the three or more LED assemblies is reflected by the concave reflector and projected forward along the longitudinal fixture axis, and heat generated by the LED assemblies is conducted rearward along the heat pipe assembly to the heat sink.

\* \* \* \* \*